(12) United States Patent
Hart et al.

(10) Patent No.: US 11,916,396 B2
(45) Date of Patent: Feb. 27, 2024

(54) SYSTEMS AND METHODS FOR CONTROL OF POWER GENERATION ASSETS

(71) Applicant: GE Grid GmbH, Frankfurt am Main (DE)

(72) Inventors: Patrick Hammel Hart, Ballston Lake, NY (US); Charles Joseph Kosuth, Asheville, NC (US); Alina Fatima Moosvi, San Fransisco, CA (US)

(73) Assignee: GE Grid GmbH, Frankfurt am Main (DE)

( * ) Notice: Subject to any disclaimer, the term of this patent is extended or adjusted under 35 U.S.C. 154(b) by 65 days.

(21) Appl. No.: 17/341,828

(22) Filed: Jun. 8, 2021

(65) Prior Publication Data
US 2022/0393476 A1 Dec. 8, 2022

(51) Int. Cl.
H02J 3/46 (2006.01)
H02J 3/38 (2006.01)

(52) U.S. Cl.
CPC ............ *H02J 3/46* (2013.01); *H02J 3/381* (2013.01); *H02J 2203/10* (2020.01); *H02J 2300/24* (2020.01); *H02J 2300/28* (2020.01)

(58) Field of Classification Search
CPC .......... H02J 3/46; H02J 3/381; H02J 2203/10; H02J 2300/24; H02J 2300/28
See application file for complete search history.

(56) References Cited

U.S. PATENT DOCUMENTS

| | | | |
|---|---|---|---|
| 9,240,745 B2 | 1/2016 | Venkataraman | |
| 9,271,240 B2 | 2/2016 | Shin et al. | |
| 9,279,411 B2 * | 3/2016 | Beekmann | ............... F03D 1/06 |
| 9,490,724 B2 | 11/2016 | Balocco | |
| 9,728,974 B2 | 8/2017 | Rudolph et al. | |
| 9,882,507 B2 | 1/2018 | Garrity et al. | |
| 9,920,746 B2 | 3/2018 | Diedrichs et al. | |
| 10,530,163 B2 | 1/2020 | Rodriguez et al. | |

(Continued)

FOREIGN PATENT DOCUMENTS

| | | |
|---|---|---|
| EP | 2315330 A2 | 4/2011 |
| EP | 3087436 A1 | 11/2016 |

OTHER PUBLICATIONS

Zhu Yanfang et al., "Design and Application of Automatic Generation Control System with Wind Power", 2020 5th International Conference on Electromechanical Control Technology and Transportation (ICECTT), IEEE, May 15, 2020, pp. 291-296, XP033845458, DOI: 10.1109/ICECTT50890.2020.00071.

(Continued)

*Primary Examiner* — Charles Cai
(74) *Attorney, Agent, or Firm* — Armstrong Teasdale LLP

(57) ABSTRACT

A control system for a power production facility is provided. The control system includes a plurality of power generating assets configured to supply power to a power grid. The control system further includes a controller coupled in communication with the plurality of power generating assets. The controller is configured to receive at least one feedback value corresponding to a feedback parameter. The at least one feedback value represents a measured value associated with the power grid. The control system is further configured to determine, based on the received at least one feedback value, to operate in one of a closed-loop mode or an open-loop mode of control.

19 Claims, 4 Drawing Sheets

(56) References Cited

U.S. PATENT DOCUMENTS

| | | |
|---|---|---|
| 10,797,615 B2 | 10/2020 | Chhabra |
| 2014/0225370 A1 | 8/2014 | Mayer |
| 2017/0082992 A1 | 3/2017 | Riley |
| 2018/0138823 A1 | 5/2018 | Garrity et al. |
| 2019/0013756 A1* | 1/2019 | Huntington ............. F01D 17/02 |
| 2019/0267806 A1* | 8/2019 | Scott ......................... H02J 3/18 |
| 2019/0393723 A1* | 12/2019 | Pavlovski ................. H02J 3/38 |
| 2020/0063712 A1 | 2/2020 | Green |
| 2020/0116127 A1* | 4/2020 | Brombach ................ H02J 3/10 |

OTHER PUBLICATIONS

International Search Report and Written Opinion for PCT/US/2022/032486 dated Oct. 4, 2022, 16 pgs.

* cited by examiner

SYSTEMS AND METHODS FOR CONTROL OF POWER GENERATION ASSETS

BACKGROUND

The field of the invention relates generally to control systems, and more particularly, to control systems for a power generating assets in power production facilities.

Power production facilities, or "farms," include a group of power generating assets, such as wind turbines, solar cells, or the like, and are used to supply power to power grids. Such power grids generally are required to maintain certain operating parameters, such as a prescribed frequency, voltage, and reactive power. Accordingly, power production facilities include control systems to ensure that the output of the power generating assets conforms to the grid requirements. One method used by such control systems utilizes closed-loop control, wherein parameters of the power generating assets, such as voltage and active power, are controlled based on feedback received from the power grid. Such closed-loop control generally reduces steady state error over time, increasing the precision with which grid requirements can be maintained. However, when operating controls at the farm level, measurement delays, communication delays, and time constants associated with closed-loop control may restrict the ability of the power production facility to respond to an event or disturbance, such as damage to the power grid or a manual reconfiguration of the power production facility, in a timely matter. In such cases, the speed of response may be prioritized over steady state error. A control system that can respond quickly to such an event or disturbance is therefore desirable.

BRIEF DESCRIPTION

In one aspect, a control system for a power production facility is provided. The control system includes a plurality of power generating assets configured to supply power to a power grid. The control system further includes a controller coupled in communication with the plurality of power generating assets. The controller is configured to receive at least one feedback value corresponding to a feedback parameter. The at least one feedback value represents a measured value associated with the power grid. The control system is further configured to determine, based on the received at least one feedback value, to operate in one of a closed-loop mode or an open-loop mode of control.

In another aspect, a method for controlling a power production facility including a plurality of power generating assets configured to supply power to a power grid is provided. The method is performed by a controller coupled in communication with the plurality of power generating assets. The method includes receiving, by the controller, at least one feedback value corresponding to a feedback parameter. The at least one feedback value represents a measured value associated with the power grid. The method further includes determining, by the controller based on the received at least one feedback value, to operate in one of a closed-loop mode or an open-loop mode of control.

In another aspect, a controller for a power production facility including a plurality of power generating assets configured to supply power to a power grid is provided. The controller is coupled in communication with the plurality of power generating assets. The controller is configured to receive at least one feedback value corresponding to a feedback parameter. The at least one feedback value represents a measured value associated with the power grid. The controller is further configured to determine, based on the received at least one feedback value, to operate in one of a closed-loop mode or an open-loop mode of control.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
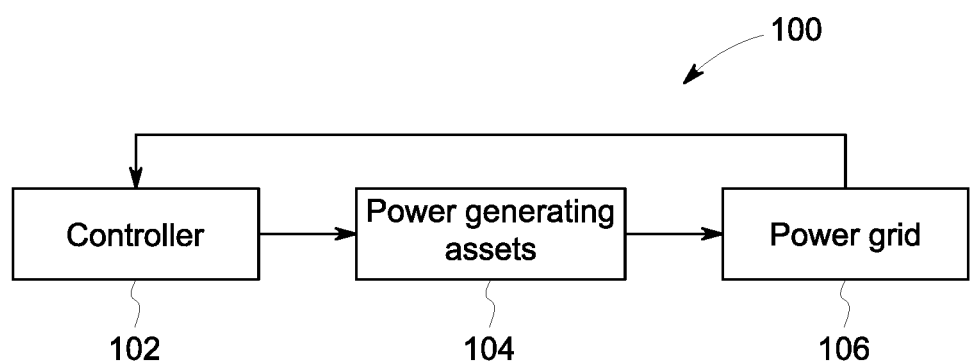
FIG. 1 is a block diagram of an example control system.

In the following specification and the claims, reference will be made to a number of terms, which shall be defined to have the following meanings.

The singular forms "a", "an", and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The embodiments described herein include a control system including a plurality of power generating assets configured to supply power to a power grid. The power generating assets may be, for example, wind turbines, solar cells, battery storage cells, or a combination thereof, that together form a power production facility. The control system further includes a controller coupled in communication with each of the plurality of power generating assets. The controller is configured to operate in one of two modes.

In the first mode, sometimes referred to herein as the "closed-loop mode," the controller operates based on feedback data received from the power grid. In the closed-loop mode, the controller is configured to receive at least one feedback value corresponding to a feedback parameter. The at least one feedback value represents a value measured from the power grid, such as a frequency, voltage, or reactive power. Based on the received at least one feedback value and a setpoint corresponding to the feedback parameter, the controller is configured to compute a first control value corresponding to a control parameter, such as an output active power or voltage for one of the plurality of power generating assets. The controller controls at least one of the plurality of power generating assets to operate according to the computed first control value.

In the second mode, sometimes referred to herein as the "open-loop mode," rather than operating based on feedback from the power grid, the controller operates the power generating assets on an updated setpoint determined by a feedforward system. In some embodiments, the updated setpoint is expressed as a delta command, which may be, for example, a demanded change from the current control value. As such, the control system may respond more quickly to triggering events. These triggering events such as, for example, damage or faults on the power grid, reconfiguration events, or other events causing feedback parameters of the power grid to deviate significantly from the desired setpoint, may require a quick response without the need for great precision, such as that provided in the closed-loop mode.

In the open-loop mode, the controller is configured to generate the delta command. The delta command corresponds to a change in a value of the control parameter. Based on the delta command, the controller is configured to compute a second control value corresponding to the control parameter, and control at least one of the plurality of power generating assets to operate according to the computed second control value.

Additionally, the control methods described herein may be applied to systems other than power production or distribution systems. More specifically, a combination of closed-loop control and open-loop control may be applied with respect to other control systems operating in various contexts.

FIG. 1 is a block diagram illustrating an example control system 100. Control system 100 includes a controller 102 and a plurality of power generating assets 104 configured to supply power to power grid 106. Controller 102 and power generating assets 104 together may form at least part of a power production facility. For example, in some embodiments, power generating assets 104 are individual wind turbines that make up a wind farm. In alternative examples, power generating assets 104 may be photovoltaic or solar cells, battery energy storage cells, or other electrical energy producing devices. Power grid 106 generally must conform to certain operating requirements, for example, to operate according to a prescribed voltage, frequency, and reactive power. The voltage, frequency, and reactive power of power grid 106 are affected by control parameters such as the active power and voltage output of power generating assets 104. Accordingly, controller 102 is configured to control the active power and voltage of power generating assets 104 to maintain the prescribed voltage and frequency of power grid 106.

Controller 102 is configured to operate in one of two different modes. By default, controller 102 operates in a closed-loop mode. In the closed loop mode, controller 102 uses feedback from power grid 106 to control power generating assets 104. For example, in some embodiments, controller 102 receives a measurement corresponding to a feedback parameter at power grid 106, such as a voltage, frequency, or reactive power value. Based on a difference between the measurement and the prescribed setpoint, controller 102 computes an error value. Controller 102 uses the computed error value to further compute a control value, such as an active power or voltage value, and operates power generating assets 104 according to the computed control value. For example, if the detected voltage or frequency is low, controller 102 may increase the power or voltage output of power generating assets 104. As described in further detail below, in some embodiments, controller 102 is configured to compute the control value based on the error value using a proportional integral derivative (PID) control algorithm.

Controller 102 further operates in an open-loop mode. In the open-loop mode, controller 102 controls the operating parameter of power generating assets 104 according to a predetermined updated setpoint, rather than based on detected properties of power grid 106. For example, in some embodiments, controller 102 generates or receives a delta command, such as a value of expected change in power or voltage of power generating assets 104, and then adjusts the power or voltage of power generating assets 104 accordingly. In some embodiments, controller 102 operates in the open-loop mode when an event occurs that requires a high-speed adjustment of power generating assets 104. Such an event may include, for example, an unexpected drop in frequency, or a voltage of power grid 106 that exceeds a threshold. When the event has ended, for example, when frequency or voltage returns to normal values or a set amount of time has passed, controller 102 may revert to the closed-loop mode.

Figure 2:
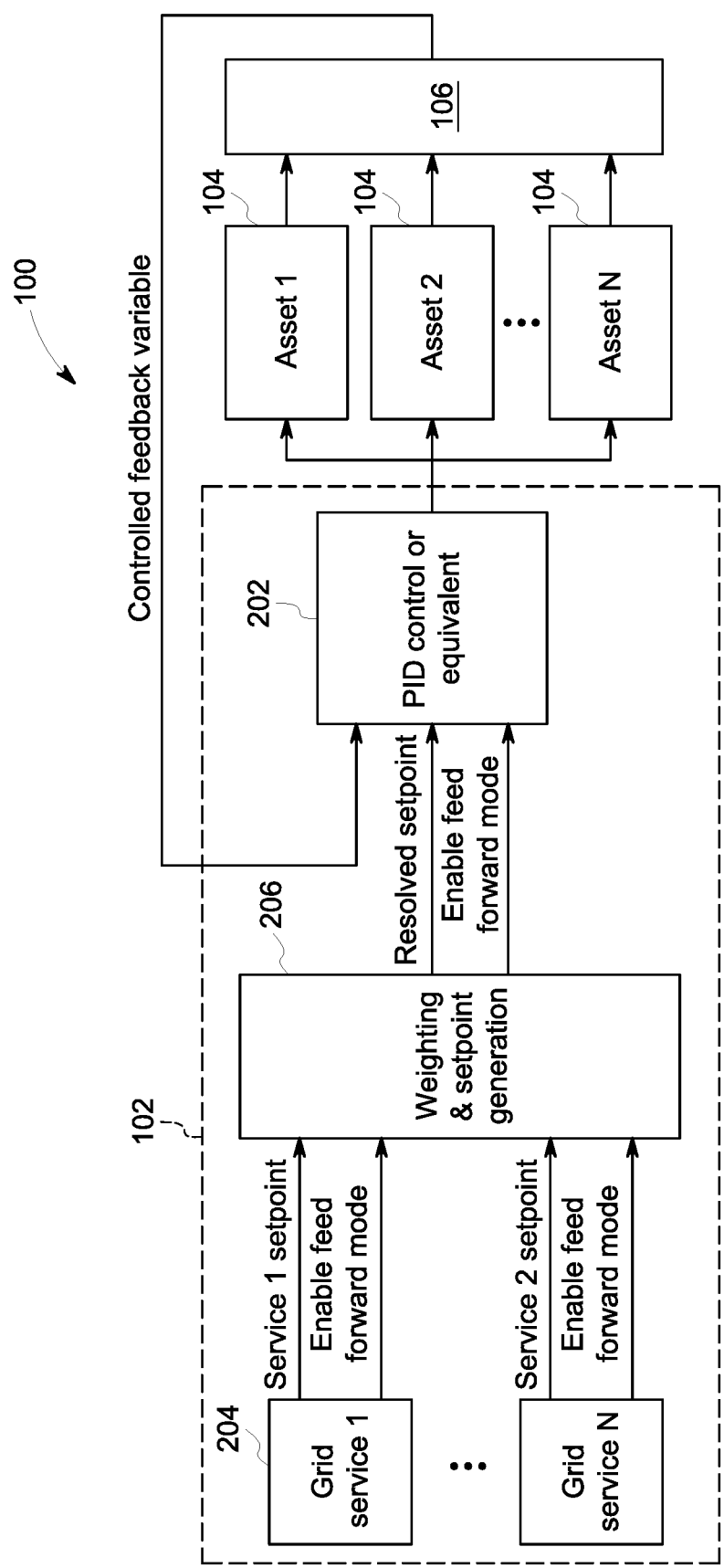
FIG. 2 is another block diagram of the example control system illustrated in FIG. 1.

FIG. 2 is another block diagram of control system 100 showing further detail of controller 102. Controller 102 includes a proportional-integral-derivative (PID) controller 202, a plurality of grid service components 204, and a weighting and setpoint generating component 206. PID controller 202 is configured to determine one or more control parameter values at which to control power generating assets 104. The control parameters may correspond to different operating parameters such as, for example, power or voltage. In some embodiments, PID controller 202 may generate asset-specific control parameters for each power-generating asset 104.

When operating in the closed-loop mode, PID controller 202 may generate control parameters values based on feedback parameter values corresponding to power grid 106 such as, for example, frequency or voltage. Based on the feedback parameters and a setpoint (e.g., a desired frequency or voltage), PID controller 202 computes an error value. As described in further detail below, PID controller 202 uses proportional, integral, and derivative terms to compute updated control parameter values based on the error value, and controls power generating assets 104 based on the updated control parameter values.

Occasionally, an event may occur that requires a rapid adjustment of the control parameters in order to maintain the desired setpoint. In such circumstances, PID controller 202 may switch to the open-loop mode and operate in the open-loop mode temporarily. In some embodiments, PID controller 202 operates in the open-loop mode while receiving an enable feed forward command from, for example, grid service components 204 via weighting and setpoint generating component 206. The feed forward command may be, for example, a Boolean logic value. Grid service components 204 generate the enable feed forward command in response to an event that requires relatively rapid adjustment of the control parameters, such as when a difference between one of the feedback parameters and the corresponding setpoint exceeds a threshold difference.

When operating in the open-loop mode, grid service components 204 are configured to, in response to identifying a triggering event, generate a delta command that corresponds to a desired change in the control parameter. The one or more delta commands are weighted and aggregated by weighting and setpoint generation component 206, which transmits an updated setpoint to PID controller 202 along with the enable feed forward command. In response to receiving the enable feed forward command, PID controller 202 controls power generating assets 104 using a control parameter value based on the updated setpoint. As such, the control parameter, and accordingly the characteristics of power grid 106, can be adjusted relatively quickly when controller 102 operates in the open-loop mode. When the event triggering the open-loop mode ends, grid service components 204 cease generating the enable feed forward command, and PID controller 202 reverts to operation in the closed-loop mode.

Figure 3:
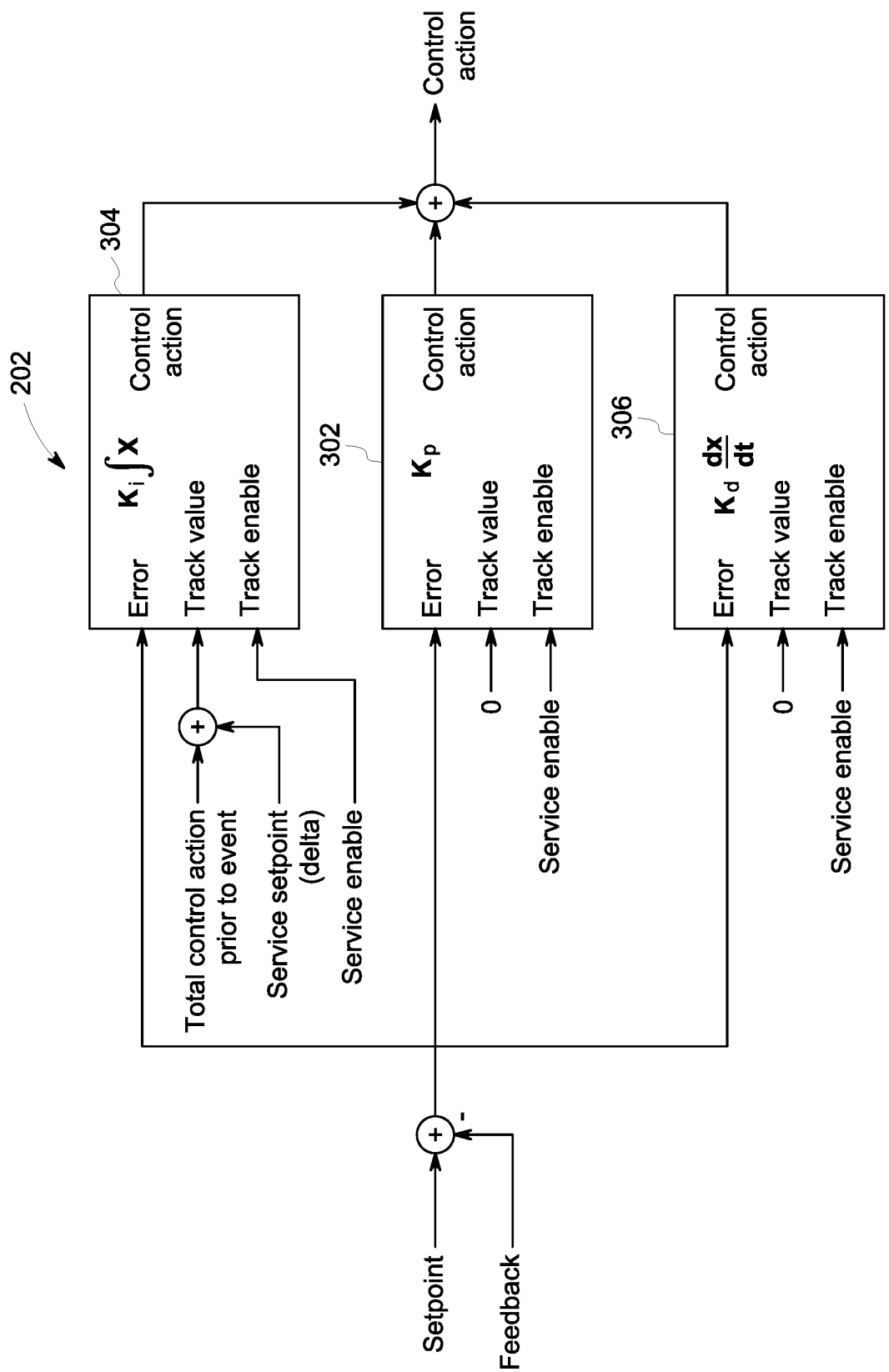
FIG. 3 is a block diagram of an example proportional integral derivative (PID) controller that may be used in the control system depicted in FIGS. 1 and 2.

FIG. 3 is a block diagram of PID controller 202. PID controller 202 includes a proportional component 302, an integral component 304, and a derivative component 306. When PID controller is operating in the closed-loop mode, proportional component 302, integral component 304, and derivative component 306 receive an error value computed based on a difference between the setpoints (e.g., the desired frequency or voltage) and the feedback parameters (e.g., the actual measured frequency or voltage), and output respective sub-control parameters, which are aggregated to determine the control parameters output to power generating assets 104. Proportional component 302 outputs a value corresponding to the error value multiplied by a proportional coefficient ($K_p$). Integral component 304 outputs a value corresponding to the error value integrated overt time multiplied by an integral coefficient ($K_i$). Derivative component 306 outputs a value corresponding to a time derivative of the error value multiplied by a derivative coefficient ($K_d$). The coefficients $K_p$, $K_i$ and $K_d$ may be selected such that the error can be reduced relatively quickly while minimizing overshoot. Accordingly, when operating in the closed-loop mode, PID controller 202 generates a control parameter that enables a precise control of the parameters of power grid 106 with low steady-state error.

When an event occurs that triggers a transition to the open-loop mode, proportional component 302, integral component 304, and derivative component 306 receive the enable feed forward command. In response to receiving the enable feed forward command, proportional component 302, integral component 304, and derivative component 306 cease outputting based on the error, and PID controller 202 instead outputs a control parameter value based on the delta command. Accordingly, when operating in the open-loop mode, parameters of power grid 106 can be adjusted more quickly in response to the triggering event. When grid service components 204 determine that the triggering event ends, grid service components 204 cease transmitting the enable feed forward command, and proportional component 302, integral component 304, and derivative component 306 resume operating in the closed-loop mode.

Figure 4:
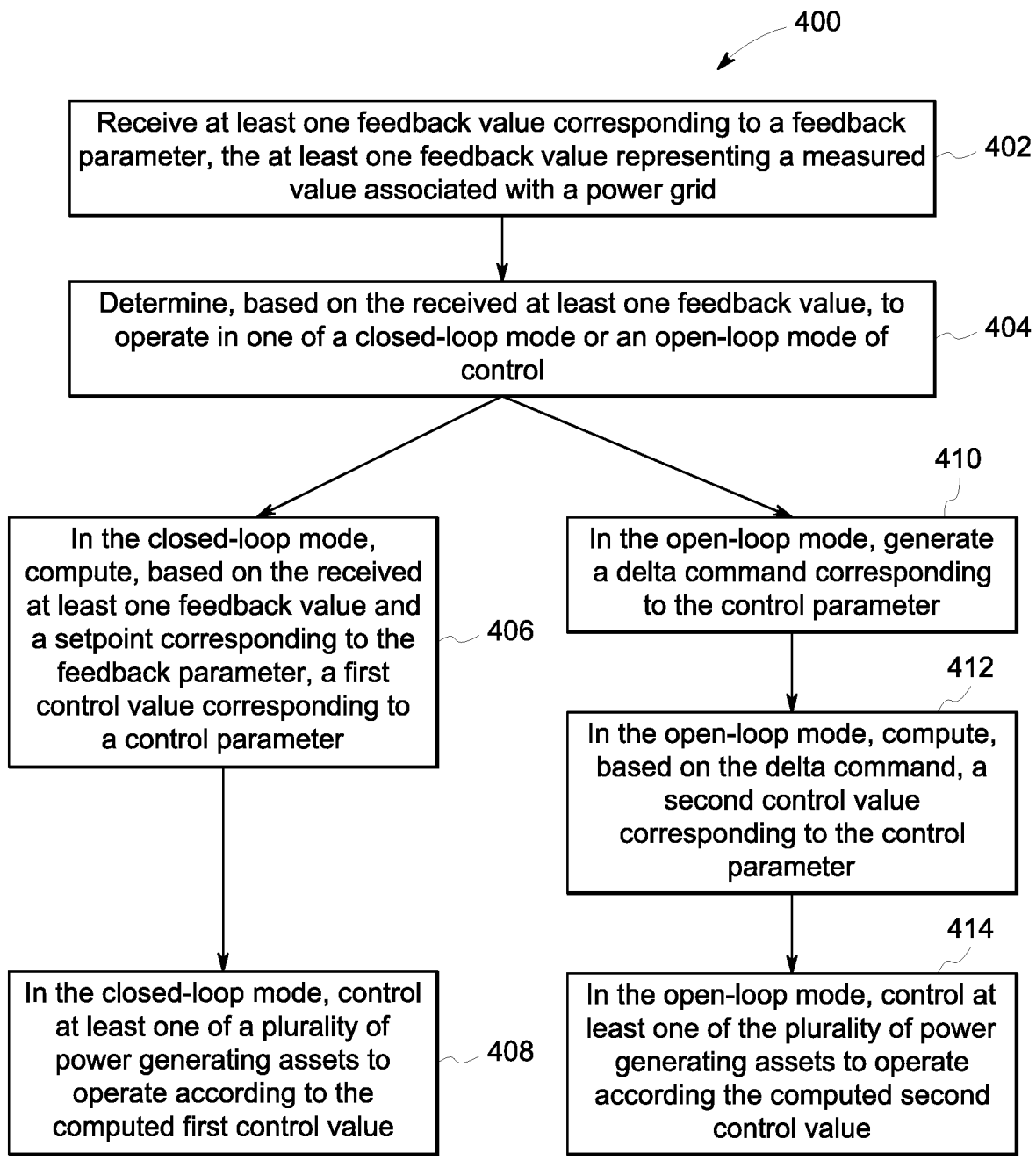
FIG. 4 is a flowchart of an example method for controlling a power production facility.

FIG. 4 is a flowchart illustrating an example method 400 for controlling a power production facility. In some embodiments, method 400 is performed by a control system such as control system 100 (shown in FIGS. 1 and 2), for example, using controller 102.

Method 400 includes receiving 402, by a controller (such as controller 102), at least one feedback value corresponding to a feedback parameter. The at least one feedback value represents a measured value associated with a power grid (such as power grid 106). The feedback parameter may be, for example, a frequency, voltage, or reactive power of power grid 106. For example, in certain embodiments, the feedback parameter is frequency and the control parameter is active power. As another example, in other embodiments, the feedback parameter is reactive power and the control parameter is voltage.

Method 400 further includes determining 404 based on the received at least one feedback value, to operate in one of a closed-loop mode or an open-loop mode of control. In some embodiments, method 400 further includes operating the controller in the open-loop mode in response to detecting a triggering event. In some such embodiments, detecting the triggering event includes determining, by the controller, that a difference between the setpoint and the feedback value is greater than a threshold difference.

In some embodiments, method 400 further includes, in a closed-loop mode, computing 406, by the controller, based on the received at least one feedback value and a setpoint corresponding to the feedback parameter, a first control value corresponding to a control parameter. The control value may be, for example, an active power or voltage of one of power generating assets 104. In some embodiments computing the control value includes computing, by the controller, an error value based on the feedback value and the setpoint, the error value corresponding to the feedback parameter, and computing, by the controller, the first control value based on the error value. In some such embodiments, computing the first control value based on the error value includes computing, by the controller, a proportional term, an integral term, and a derivative term based on the error value, and summing, by the controller, the proportional term, the integral term, and the derivative term to determine the first control value.

In such embodiments, method 400 further includes, in the closed-loop mode, controlling 408, by the controller, at least one of a plurality of power generating assets (such as power generating assets 104) to operate according to the computed first control value. In some embodiments, the power generating assets include at least one of a wind turbine, an energy storage device, or a solar cell.

In some embodiments, method 400 further includes, in an open-loop mode, generating 410, by the controller, a delta command corresponding to the control parameter. For example, the delta command may be a command to adjust the active power or voltage setpoint of one of power generating assets 104 by a certain amount.

In such embodiments, method 400 further includes, in the open-loop mode, computing 412, by the controller, based on the delta command, a second control value corresponding to the control parameter.

In such embodiments, method 400 further includes, in the open-loop mode, controlling 414, by the controller, at least one of the plurality of power generating assets to operate according to the computed second control value. In certain such embodiments, method 400 further includes, in the open-loop mode, controlling at least two of the plurality of power generating assets to operate according to the computed open-loop control value. In some such embodiments, method 400 further includes, in the open-loop mode, computing a different respective open-loop control value for each power generating asset of the plurality of power generating assets.

In some embodiments, the controller includes at least one grid service component, and method 400 further includes generating, by the grid service component, the delta command based on data received from the power grid. In some embodiments, the controller includes a plurality of grid service components and a weighting and setpoint generating component, and method 400 further includes generating, by the plurality of grid service components, respective sub-delta commands, and generating, by the weighting and setpoint generating component, the delta command by summing the sub-delta commands.

An example technical effect of the methods, systems, and apparatus described herein includes at least one of: (a) reducing a response time to an event requiring an adjustment in operation of a power production facility by controlling power generating assets of the power production facility in an open-loop mode; and (b) reducing steady state error in operation of a power production facility by operating power generating assets of the power production facility in a closed-loop mode when an increased response rate is not required.

Example embodiments of a control system are provided herein. The systems and methods of operating and manufacturing such systems and devices are not limited to the specific embodiments described herein, but rather, components of systems and/or steps of the methods may be utilized independently and separately from other components and/or steps described herein. For example, the methods may also be used in combination with other electronic systems, and are not limited to practice with only the electronic systems, and methods as described herein. Rather, the example embodiments can be implemented and utilized in connection with many other electronic systems.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above embodiments are examples only, and thus are not intended to limit in any way the definition and/or meaning of the term processor and processing device.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A control system for a power production facility, said control system comprising:
   a plurality of power generating assets configured to supply power to a power grid; and
   a controller coupled in communication with said plurality of power generating assets, said controller configured to:
      operate one or more of said plurality of power generating assets according to a setpoint;
      receive at least one feedback value corresponding to a feedback parameter, the at least one feedback value representing a measured value associated with the power grid;
      determine, based on the received at least one feedback value, to operate in one of a closed-loop mode or an open-loop mode of control, wherein said controller operates in the open-loop mode in response to a difference computed between the setpoint and the at least one feedback value exceeding a threshold difference; and
      control the one or more of said plurality of power generating assets in the determined closed-loop mode or the determined open-loop mode.

2. The control system of claim 1, wherein said controller is further configured to:
   in the closed-loop mode, compute, based on the received at least one feedback value and the setpoint corresponding to the feedback parameter, a closed-loop control value corresponding to a control parameter; and
   in the closed-loop mode, control at least one of said plurality of power generating assets to operate according to the computed closed-loop control value.

3. The control system of claim 2, wherein to compute the closed-loop control value, said controller is configured to:
   compute an error value based on the at least one feedback value and the setpoint, the error value corresponding to the feedback parameter; and
   compute the closed-loop control value based on the error value.

4. The control system of claim 3, wherein to compute the closed-loop control value based on the error value, said controller is configured to:
   compute a proportional term, an integral term, and a derivative term based on the error value; and
   sum the proportional term, the integral term, and the derivative term to determine the closed-loop control value.

5. The control system of claim 1, wherein said controller is further configured to:
   in the open-loop mode, generate a delta command corresponding to a control parameter;
   in the open-loop mode, compute, based on the delta command, an open-loop control value corresponding to the control parameter; and
   in the open-loop mode, control at least one of said plurality of power generating assets to operate according to the computed open-loop control value.

6. The control system of claim 5, wherein said controller comprises at least one grid service component comprising a processing device configured to generate the delta command based on data received from the power grid.

7. The control system of claim 5, wherein said controller comprises a plurality of grid service components and a weighting and setpoint generating component, said grid service components each comprising a first processing device configured to generate respective sub-delta commands, said weighting and setpoint generating component comprising a second processing device configured to generate the delta command by summing the sub-delta commands.

8. The control system of claim 5, wherein said controller is further configured to, in the open-loop mode, control at least two of said plurality of power generating assets to operate according to the computed open-loop control value.

9. The control system of claim 5, wherein said controller is further configured to, in the open-loop mode, compute a different respective open-loop control value for each power generating asset of said plurality of power generating assets.

10. The control system of claim 1, wherein said controller is further configured to operate in the open-loop mode in response to detecting a triggering event.

11. The control system of claim 1, wherein the feedback parameter is a frequency and a control parameter is an active power.

12. The control system of claim 1, wherein the feedback parameter is reactive power and a control parameter is a voltage.

13. The control system of claim 1, wherein at least one of said plurality of power generating assets comprises at least one of a wind turbine, an energy storage device, or a solar cell.

14. A method for controlling a power production facility including a plurality of power generating assets configured to supply power to a power grid, said method performed by a controller coupled in communication with the plurality of power generating assets, said method comprising:
   operating, by the controller, one or more of said plurality of power generating assets according to a setpoint;
   receiving, by the controller, at least one feedback value corresponding to a feedback parameter, the at least one feedback value representing a measured value associated with the power grid;
   determining, by the controller based on the received at least one feedback value, to operate in one of a closed-loop mode or an open-loop mode of control, wherein the controller operates in the open-loop mode in response to a difference computed between the setpoint and the at least one feedback value exceeding a threshold difference; and
   controlling, by the controller, the one or more of said plurality of power generating assets in the determined closed-loop mode or the determined open-loop mode.

15. The method of claim 14, further comprising:
   in the closed-loop mode, computing, by the controller, based on the received at least one feedback value and the setpoint corresponding to the feedback parameter, a closed-loop control value corresponding to a control parameter; and
   in the closed-loop mode, controlling, by the controller, at least one of the plurality of power generating assets to operate according to the computed closed-loop control value.

16. The method of claim 15, wherein the computing the closed-loop control value comprises:
   computing, by the controller, an error value based on the at least one feedback value and the setpoint, the error value corresponding to the feedback parameter; and
   computing, by the controller, the closed-loop control value based on the error value.

17. The method of claim 16, wherein the computing the closed-loop control value based on the error value comprises:
   computing, by the controller, a proportional term, an integral term, and a derivative term based on the error value; and
   summing, by the controller, the proportional term, the integral term, and the derivative term to determine the closed-loop control value.

18. The method of claim 14, further comprising:
   in the open-loop mode, generating, by the controller, a delta command corresponding to a control parameter;
   in the open-loop mode, computing, by the controller based on the delta command, an open-loop control value corresponding to the control parameter; and
   in the open-loop mode, controlling, by the controller, at least one of the plurality of power generating assets to operate according to the computed open-loop control value.

19. A controller for a power production facility including a plurality of power generating assets configured to supply power to a power grid, said controller coupled in communication with the plurality of power generating assets, said controller configured to:
   operate one or more of said plurality of power generating assets according to a setpoint;
   receive at least one feedback value corresponding to a feedback parameter, the at least one feedback value representing a measured value associated with the power grid;
   determine, based on the received at least one feedback value, to operate in one of a closed-loop mode or an open-loop mode of control, wherein said controller operates in the open-loop mode in response to a difference computed between the setpoint and the at least one feedback value exceeding a threshold difference; and
   control the one or more of said plurality of power generating assets in the determined closed-loop mode or the determined open-loop mode.

* * * * *

UNITED STATES PATENT AND TRADEMARK OFFICE
CERTIFICATE OF CORRECTION

| | | |
|---|---|---|
| PATENT NO. | : 11,916,396 B2 | |
| APPLICATION NO. | : 17/341828 | |
| DATED | : February 27, 2024 | |
| INVENTOR(S) | : Patrick Hammel Hart et al. | |

It is certified that error appears in the above-identified patent and that said Letters Patent is hereby corrected as shown below:

On the Title Page

In item (73), in Assignee, delete "GE Grid GmbH, Frankfurt am Main (DE)" and insert therefor
-- GE GRID SOLUTIONS LLC, Atlanta, GA (US) --.

Signed and Sealed this
Thirtieth Day of April, 2024

Katherine Kelly Vidal
*Director of the United States Patent and Trademark Office*